United States Patent
Oh et al.

(10) Patent No.: US 11,658,311 B2
(45) Date of Patent: May 23, 2023

(54) CATHODE FOR LITHIUM AIR BATTERY COMPRISING HOLLOW STRUCTURE AND METHOD OF MANUFACTURING SAME

(71) Applicants: HYUNDAI MOTOR COMPANY, Seoul (KR); KIA CORPORATION, Seoul (KR); Industry-Academic Cooperation Foundation, Yonsei University, Seoul (KR)

(72) Inventors: Gwang Seok Oh, Seoul (KR); Katie Heeyum Lim, Seoul (KR); Heejun Kweon, Seongnam-si (KR); Hansung Kim, Seoul (KR)

(73) Assignees: Hyundai Motor Company, Seoul (KR); Kia Motors Corporation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 17/399,575

(22) Filed: Aug. 11, 2021

(65) Prior Publication Data

US 2021/0376335 A1 Dec. 2, 2021

Related U.S. Application Data

(62) Division of application No. 16/704,273, filed on Dec. 5, 2019, now Pat. No. 11,114,673.

(30) Foreign Application Priority Data

May 23, 2019 (KR) .......................... 10-2019-0060899

(51) Int. Cl.
*H01M 4/96* (2006.01)
*H01M 4/88* (2006.01)
(Continued)

(52) U.S. Cl.
CPC ........... *H01M 4/96* (2013.01); *H01M 4/8875* (2013.01); *H01M 4/8882* (2013.01); *H01M 12/08* (2013.01); *H01M 2004/8689* (2013.01)

(58) Field of Classification Search
CPC ..................................................... H01M 4/96
See application file for complete search history.

(56) References Cited

U.S. PATENT DOCUMENTS

2011/0104576 A1* 5/2011 Johnson ................ H01M 4/131
429/405
2013/0214457 A1 8/2013 David
(Continued)

OTHER PUBLICATIONS

U.S. Notice of Allowance dated May 7, 2021 issued in U.S. Appl. No. 16/704,273.

*Primary Examiner* — Brian R Ohara
(74) *Attorney, Agent, or Firm* — Morgan, Lewis & Bockius LLP

(57) ABSTRACT

The present disclosure relates to a cathode for a lithium air battery and a method of manufacturing the same, and more particularly to a method of manufacturing a cathode for a lithium air battery, in which a hollow structure including a carbon material having a nitrogen functional group is synthesized through electrospinning of a thermally decomposable polymer, coating with a nitrogen-containing polymer and heat treatment, and is utilized without a binder as a cathode carbon material for a lithium air battery, thereby increasing the performance and lifespan of a lithium air battery.

4 Claims, 15 Drawing Sheets

(51) Int. Cl.
*H01M 12/08* (2006.01)
*H01M 4/86* (2006.01)

(56) References Cited

U.S. PATENT DOCUMENTS

2017/0301924 A1 10/2017 Kang
2019/0027738 A1* 1/2019 Ocampo ............. H01M 4/1393

* cited by examiner

CATHODE FOR LITHIUM AIR BATTERY COMPRISING HOLLOW STRUCTURE AND METHOD OF MANUFACTURING SAME

CROSS REFERENCE TO RELATED APPLICATION

The present application is a divisional of U.S. patent application Ser. No. 16/704,273, filed on Dec. 5, 2019, which claims priority based on Korean Patent Application No. 10-2019-0060899, filed on May 23, 2019, the entire content of which are incorporated herein for all purposes by these references.

BACKGROUND OF THE DISCLOSURE

1. Technical Field

The present disclosure relates to a cathode for a lithium air battery composed exclusively of a hollow structure without a binder, and to a method of manufacturing the same.

2. Description of the Related Art

Due to the limitations of lithium ion batteries for use with recent technologies such as electric vehicles (EVs), hybrid electric vehicles (HEVs), etc., a next-generation lithium battery capable of solving problems with lithium ion batteries, such as the low energy density and limited capacity thereof, is receiving attention these days.

As the next-generation lithium battery, a lithium air battery is a system using oxygen in the air as a cathode active material. The lithium air battery is expected to have better capacity and energy density than the lithium ion battery because it is able to receive an unlimited supply of oxygen from the air.

The performance of the lithium air battery is greatly dependent on the properties of the materials used for the cathode. The lithium air battery is charged and discharged through oxidation and reduction between lithium at the anode and oxygen at the cathode. At the time of discharge, lithium ions oxidized at the anode are transferred to the cathode through a separator membrane via the electrolyte, and meet the reduced oxygen ions at the cathode, thus producing lithium peroxide ($Li_2O_2$). The lithium peroxide does not dissolve in the electrolyte but accumulates at the cathode due to the electrical non-conductivity thereof. Ultimately, if the lithium peroxide covers the surface of the electrode and clogs the pores, the lithium air battery becomes nonfunctional because it is impossible to transfer electrons and substances.

Consequently, the performance and lifespan of the lithium air battery are determined by the amount of lithium peroxide that is generated and stored in the cathode and the extent of decomposition thereof. Therefore, it is necessary to design a cathode material that is able to prevent the pores in the cathode from clogging with lithium peroxide generated and stored in the cathode and enables quick decomposition of lithium peroxide.

SUMMARY OF THE DISCLOSURE

Accordingly, an objective of the present disclosure is to provide a lithium air battery having high capacity and a long lifespan.

The objectives of the present disclosure are not limited to the foregoing, and will be able to be clearly understood through the following description and to be realized by the means described in the claims and combinations thereof.

The present disclosure provides a cathode for a lithium air battery, comprising a sheet having a plurality of hollow structures that are randomly entangled. One or more of, or all of, the plurality of hollow structures can have a length of 0.5 μm to 300 μm and includes a carbon material having a nitrogen functional group.

The nitrogen functional group may include graphic nitrogen (graphitic-N).

In some embodiments, the cathode may include no binder.

In other embodiments, the hollow structure may have a length of 1 μm to 100 μm.

In still further embodiments, the hollow structure may have a diameter of 2 μm to 10 μm.

In addition, the present disclosure provides a method of manufacturing a cathode for a lithium air battery, comprising preparing a fibrous polymer by electrospinning a spinning solution including a thermally decomposable polymer, manufacturing a fibrous structure comprising a core including the fibrous polymer and a sheath including a nitrogen-containing polymer by coating the surface of the fibrous polymer with the nitrogen-containing polymer, manufacturing a film configured such that the fibrous structures are randomly entangled, and heat-treating the film.

The thermally decomposable polymer may be selected from the group consisting of polystyrene (PS), poly(methyl methacrylate) (PMMA) and combinations thereof.

The nitrogen-containing polymer may be selected from the group consisting of polydopamine (PDA), polyacrylonitrile (PAN), polypyrrole (PPy), polyaniline (PANI) and combinations thereof.

The fibrous structure may be manufactured by adding the fibrous polymer to a polymer solution including at least one selected from the group consisting of a nitrogen-containing monomer, a nitrogen-containing polymer and combinations thereof and performing stirring.

The fibrous structure may be manufactured by applying the nitrogen-containing polymer at a thickness of 10 nm to 100 nm on the surface of the fibrous polymer.

The fibrous structure may be manufactured by performing coating of the surface of the fibrous polymer with the nitrogen-containing polymer 1 to 10 times.

The method may further comprise subjecting the fibrous structure to ultrasonication before manufacturing the film.

The sheet, configured such that hollow structures including a carbon material having a nitrogen functional group are randomly entangled, may be obtained by thermally decomposing the core of the fibrous structure and carbonizing the sheath of the fibrous structure through heat treatment of the film.

The sheet may be obtained by heat-treating the film at a temperature ranging from a thermal decomposition temperature of the core to a carbonizing temperature of the sheath.

The sheet may be obtained by heat-treating the film at a temperature of 600° C. to 900° C. for 1 hr to 3 hr.

According to the present disclosure, a cathode for a lithium air battery includes a hollow structure, whereby the transfer of a substance such as oxygen in the cathode is not impeded by lithium peroxide generated and stored upon discharging.

According to the present disclosure, the cathode for a lithium air battery includes no binder, and thus side reactions due to the binder do not occur.

According to the present disclosure, the cathode for a lithium air battery has a hollow structure that is relatively short in length, thus increasing the efficiency of internal space utilization of the cathode to thereby improve the reversibility of oxidation and reduction in the cathode.

According to the present disclosure, the cathode for a lithium air battery is configured such that the sheath of the hollow structure can consist of the nitrogen-doped carbon, thus further promoting the oxidation and reduction in the cathode.

Consequently, the use of the cathode for a lithium air battery according to the present disclosure can significantly increase the capacity and lifespan of a lithium air battery.

The effects of the present disclosure are not limited to the foregoing, and should be understood to include all effects that can be reasonably anticipated from the following description.

DESCRIPTION OF SPECIFIC EMBODIMENTS

Figure 1:
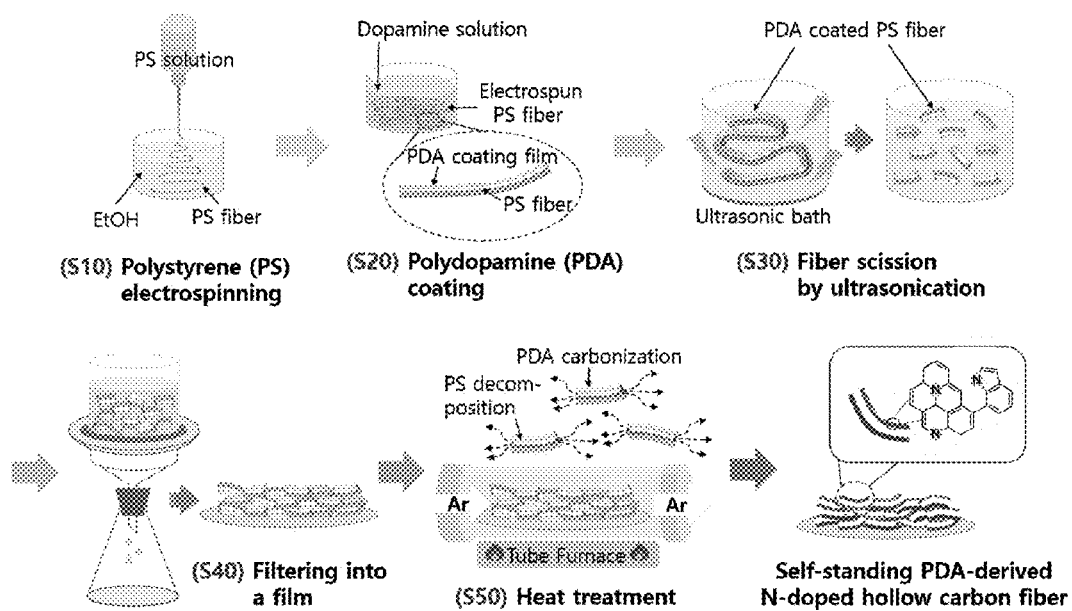
FIG. 1 schematically shows a process of manufacturing a cathode for a lithium air battery according to the present disclosure.

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 schematically shows a process of manufacturing a cathode for a lithium air battery according to the present disclosure.

Specifically, the method of manufacturing a cathode for a lithium air battery according to the present disclosure includes preparing a fibrous polymer by electrospinning a spinning solution including a thermally decomposable polymer (S10), manufacturing a fibrous structure comprising a core including the fibrous polymer and a sheath including a nitrogen-containing polymer by coating the surface of the fibrous polymer with the nitrogen-containing polymer (S20), subjecting the fibrous polymer to ultrasonication (S30), manufacturing a film configured such that the fibrous structures are randomly entangled (S40), and obtaining a sheet configured such that hollow structures including a carbon material having a nitrogen functional group are randomly entangled by thermally decomposing the core of the fibrous structure and carbonizing the sheath thereof through heat treatment of the film (S50).

(S10) The fibrous polymer may be obtained by electrospinning a spinning solution including a thermally decomposable polymer.

The thermally decomposable polymer may be selected from the group consisting of polystyrene (PS), poly(methyl methacrylate) (PMMA) and combinations thereof.

The conditions for the electrospinning process are not particularly limited, and may be appropriately changed depending on the kind of the thermally decomposable polymer, the specifications of a hollow structure, which will be described later, etc.

Figure 2:
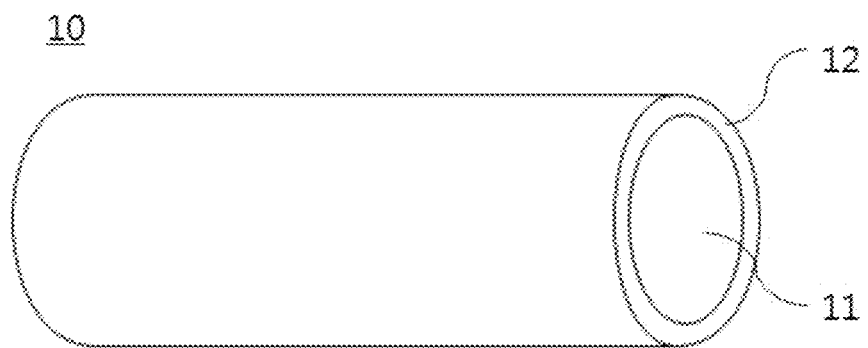
FIG. 2 schematically shows a portion of a fibrous structure, which may be obtained during the manufacture of the cathode for a lithium air battery according to the present disclosure.

(S20) The fibrous structure may be obtained by coating the surface of the fibrous polymer with a nitrogen-containing polymer. FIG. 2 is a perspective view schematically showing a portion of the fibrous structure. With reference thereto, the fibrous structure 10 includes a core 11 including a fibrous polymer, namely a thermally decomposable polymer, and a sheath applied on the surface of the core 11 and including a nitrogen-containing polymer.

The nitrogen-containing polymer may be selected from the group consisting of polydopamine (PDA), polyacrylonitrile (PAN), polypyrrole (PPy), polyaniline (PANI) and combinations thereof.

The fibrous structure may be obtained by adding the fibrous polymer to a polymer solution including any one selected from the group consisting of a nitrogen-containing monomer, a nitrogen-containing polymer and combinations thereof and then performing stirring. Specifically, when the nitrogen-containing polymer is polydopamine, the fibrous polymer is added to a polymer solution including polydopamine and/or a dopamine monomer and stirred, thereby manufacturing a fibrous structure.

The fibrous structure may be configured such that the nitrogen-containing polymer is applied at a thickness of 10 nm to 100 nm on the surface of the fibrous polymer. With reference to FIG. 2, the sheath 12 may be applied at a thickness of 10 nm to 100 nm on the core 11.

The process of coating with the nitrogen-containing polymer is not particularly limited, and may be appropriately performed depending on the kind of nitrogen-containing polymer, the type of manufacturing device, etc. Preferably, the coating with the nitrogen-containing polymer is repeated several times such that the thickness of the nitrogen-containing polymer applied on the surface of the fibrous polymer falls in the above numeral range. Specifically, the fibrous polymer is added to the polymer solution and is sufficiently stirred such that a predetermined amount of the nitrogen-containing polymer included in the polymer solution is completely applied on the surface of the fibrous polymer, after which the nitrogen-containing polymer is re-added in an amount that is the same as or similar to the above amount to the polymer solution, and the surface of the fibrous polymer is coated with the nitrogen-containing polymer thus re-added. In particular, the number of processes of coating with the nitrogen-containing polymer to manufacture a fibrous structure may be 1 to 10.

(S30) The present disclosure is not limited thereto, but the fibrous structure may be subjected to ultrasonication. When the fibrous structure is excessively long, the length of a hollow structure, which will be described later, is also increased, and thus decomposition of lithium peroxide grown in the hollow structure may become inefficient. Hence, when the fibrous structure is cut through ultrasonication, the above problems may be prevented from occurring.

The specific process for ultrasonication is not particularly limited, and may be appropriately performed under proper conditions depending on the type of an ultrasonicator, the length of the fibrous structure, etc.

(S40) A film in a predetermined shape and thickness may be manufactured from a plurality of the fibrous structures, which may or may not be subjected to ultrasonication.

The specific process for manufacturing the film is not particularly limited, and preferably, a solution including the fibrous structure is filtered such that a film, configured such that the fibrous structures are randomly entangled, is formed on the filter paper.

As used herein, "randomly entangled" does not mean that the shape, thickness and the like of the film are irregular but means that fibrous structures constituting the film are disposed in individual directions or positions without affecting each other, and may be simply interpreted to mean that the fibrous structures are provided in the form of a net structure.

Moreover, in the present disclosure, no binder is used to form a film having a predetermined shape and thickness including the fibrous structures. Even when the binder is not used, the fibrous structures are entangled in a net shape, thereby forming a film having a predetermined shape and thickness. Accordingly, a final cathode may contain no binder therein, and side reactions due to the binder may be prevented from occurring.

(S50) Finally, the film is heat-treated, whereby the core of the fibrous structure is thermally decomposed and the sheath thereof is carbonized, ultimately obtaining a sheet configured such that hollow structures including a carbon material having a nitrogen functional group are randomly entangled. Here, the sheet may be a cathode for a lithium air battery.

The core of the fibrous structure is formed of the fibrous polymer, which is obtained by electrospinning the thermally decomposable polymer, and is decomposed when heated. Accordingly, the hollow structure may be configured such that the center thereof is empty without a core material.

The hollow structure may be effectively utilized as a place for storing lithium peroxide generated during the discharge of a lithium air battery, and may also prevent pore clogging during the operation of a lithium air battery, thereby making it easy to decompose lithium peroxide at the time of recharge by facilitating the transfer of lithium ions and oxygen even in a fully discharged state.

Furthermore, when the temperature for heat treatment is appropriately adjusted, the nitrogen-containing polymer constituting the sheath of the fibrous structure is carbonized into a carbon material having a nitrogen functional group. Specifically, the film may be heat-treated at a temperature ranging from 600° C. to 900° C. for 1 hr or 3 hr.

Consequently, the sheet is configured such that the hollow structures including the carbon material having the nitrogen functional group are randomly entangled.

The nitrogen functional group refers to a composite of nitrogen (N), carbon (C) and hydrogen (H) or a composite of nitrogen (N) and carbon (C) present in the carbon material. The nitrogen functional group included in the carbon material may be selected from the group consisting of pyridinic nitrogen (pyridinic-N), pyrrolic nitrogen (pyrrolic-N), graphitic nitrogen (graphitic-N) and combinations thereof. Here, pyridinic-N, pyrrolic-N and graphitic-N are configured such that carbon (C) is substituted with nitrogen (N) in a carbon array. Specifically, pyridinic-N is configured such that two carbons (C) are linked to nitrogen (N), pyrrolic-N is configured such that two carbons (C) and one hydrogen (H) are linked to nitrogen (N), and graphitic-N is configured such that three carbons (C) are linked to nitrogen (N).

As the nitrogen-containing polymer, polydopamine, represented by Chemical Formula 1 below, may be used. When the polydopamine is carbonized, a carbon material having a nitrogen functional group with a partial structure represented by Chemical Formula 2 below may result.

[Chemical Formula 1]

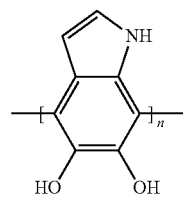

[Chemical Formula 2]

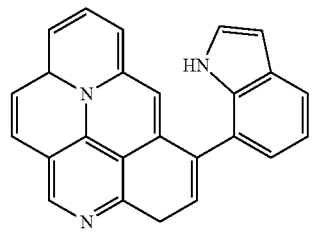

The graphitic-N is effective at oxygen reduction, which is the main reaction occurring during discharge of the lithium air battery. Thus, the hollow structure is capable of effectively promoting the oxygen reduction due to nitrogen doping.

The length, thickness and diameter of the hollow structure are not particularly limited. Preferably, the length thereof is 0.5 μm to 300 μm, and more preferably 1 μm to 100 μm. Also, a thickness of 0.05 μm to 0.5 μm and a diameter of 2 μm to 10 μm are preferable.

A better understanding of the present disclosure will be given through the following examples.

Example 1

Figure 3A:
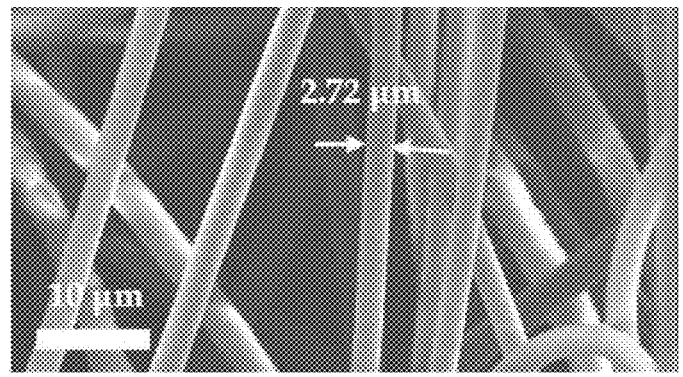
FIG. 3A is a field-emission scanning electron microscope (FE-SEM) image showing a fibrous polymer prepared in Example 1.

A spinning solution including 30 wt % of polystyrene was electrospun in ethanol for 90 min at a speed of 0.6 mL/hr, a voltage of 18 kV, and a spinning distance of 20 cm, thus obtaining a fibrous polymer. The solvent for the spinning solution was dimethyl formaldehyde. FIG. 3A is an FE-SEM image showing the fibrous polymer.

The surface of the fibrous polymer was coated with a nitrogen-containing polymer, thus manufacturing a fibrous structure. The fibrous polymer was placed in a dopamine solution comprising 450 mg of a dopamine monomer, 300 mL of distilled water, and 1.8 g of tris and stirring was then performed for about 2 hr. This procedure was carried out once.

The solution containing a plurality of the fibrous structures dispersed therein were slowly poured into a vacuum filter device, followed by slow filtration, whereby a film configured such that a plurality of the fibrous structures were randomly entangled was formed on the filter paper. The film was dried at about 80° C. for about 12 hr.

Figure 3B:
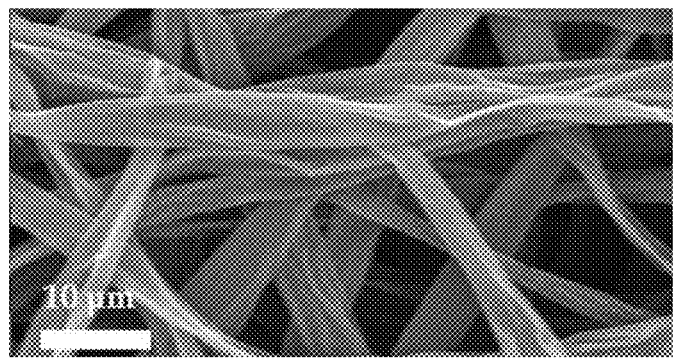
FIG. 3B is an FE-SEM image showing a hollow structure manufactured in Example 1.

The film was heat-treated in an inert gas atmosphere at 900° C. for about 1 hr, whereby the fibrous polymer (polystyrene) was thermally decomposed and simultaneously the nitrogen-containing polymer (polydopamine) was carbonized. Finally, a cathode in a sheet form comprising a plurality of the hollow structures was obtained. FIG. 3B is an FE-SEM image showing the hollow structure of Example 1.

A CR2032 coin cell was manufactured using the above cathode, a lithium metal anode having a thickness of 200 μm, a separator made of glass fiber, and an electrolyte solution including tetraethylene glycol dimethylether (TEGDME) added with 1.0 M bis(trifluoromethane)sulfonimide lithium salt (LiTFSI) as a lithium salt.

Example 2

Compared to Example 1, a fibrous structure was manufactured by performing coating of the surface of a fibrous polymer with a nitrogen-containing polymer about five times. Specifically, the fibrous polymer was placed in a dopamine solution comprising 450 mg of a dopamine monomer, 300 mL of distilled water, and 1.8 g of tris(hydroxymethyl)aminomethane (tris), and shaking was then performed for about 2 hr. Thereafter, the above dopamine solution was re-added, and the above procedure was repeated. The process of coating with the nitrogen-containing polymer was carried out a total of five times.

Figure 3C:
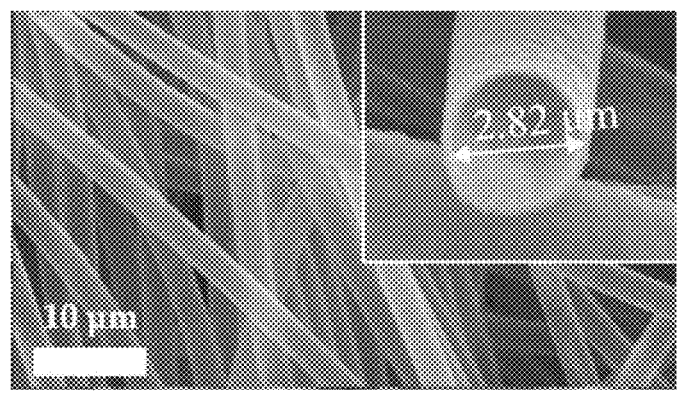
FIG. 3C is an FE-SEM image showing a hollow structure manufactured in Example 2.

In addition thereto, a coin cell (a lithium air battery) was manufactured using the same material and process as in Example 1. FIG. 3C is an FE-SEM image showing the hollow structure of Example 2.

Comparative Example 1

A polyacrylonitrile-carbonized electrode, which is a typical binder-free fibrous structure electrode, was used as a control.

A 10 wt % polyacrylonitrile/dimethylformaldehyde solution was electrospun using a drum collector for 90 min at a speed of 0.6 mL/hr, a voltage of 18 kV, and a spinning distance of 20 cm, and was then carbonized through heat treatment for 1 hr in air at 230° C. and for 1 hr in an inert gas atmosphere at 900° C.

After completion of the heat treatment, the carbonized polyacrylonitrile sheet was punched to a certain size and was used for a cathode, and a lithium air battery was manufactured in the same manner as in Example 1.

Measurement Example 1

The lithium air battery of each of Examples 1 and 2 and Comparative Example 1 was subjected to initial charge/discharge testing. When a constant current of 50 mA/$g_{carbon}$ was applied to the lithium air battery, a discharge capacity reaching 2 V, which is a capacity cutoff condition, and a charge capacity reaching 4.5 V upon recharging were measured.

Figure 4:
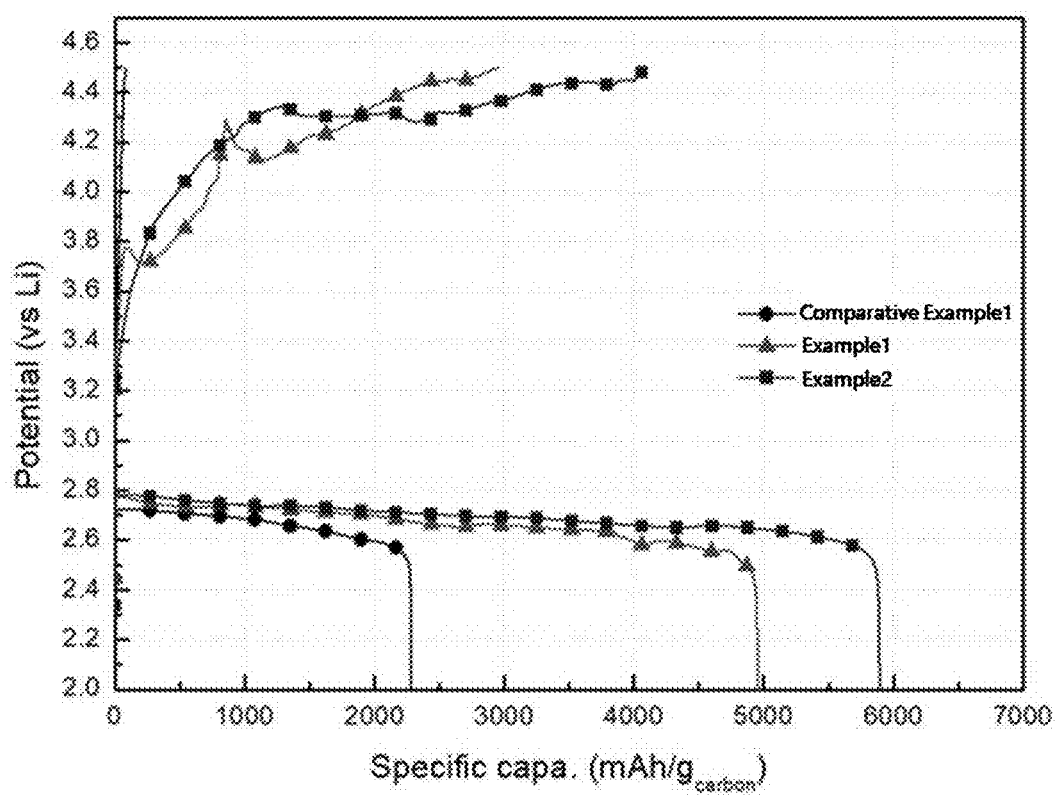
FIG. 4 is a graph showing the results of Measurement Example 1.

FIG. 4 is a graph showing the behavior curve of the constant-current-discharged/charged lithium air battery. With reference to FIG. 4, the discharge capacity was measured to be 2,291 mAh/$g_{carbon}$ in Comparative Example 1, 4,957 mAh/$g_{carbon}$ in Example 1 and 5,902 mAh/$g_{carbon}$ in Example 2. Also, the reversibility was 3.9% in Comparative Example 1 but was improved to 59.7% in Example 1 and 71.0% in Example 2.

According to the present disclosure, the cathode comprising the hollow structure exhibited increased discharge capacity and high reaction reversibility compared to the cathode comprising no hollow structure, from which the cathode comprising the hollow structure is evaluated to be more favorable for the operation of a lithium air battery.

Example 3

A fibrous structure was manufactured using the same material and process as in Example 1. Thereafter, the fibrous structure was cut in length through ultrasonication. Specifically, the fibrous structure was dispersed in 300 mL of distilled water, and the length thereof was cut through ultrasonication for about 2 hr.

Figure 5A:
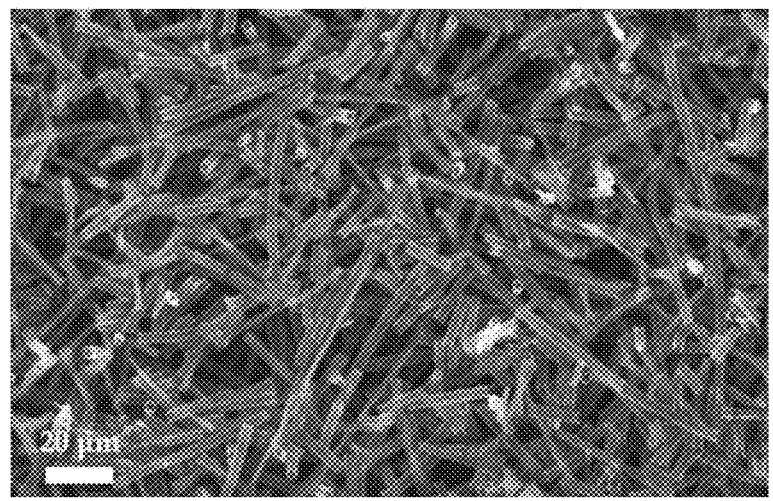
FIG. 5A is an FE-SEM image showing a hollow structure manufactured in Example 3.

In addition thereto, a coin cell (a lithium air battery) was manufactured in the same manner as in Example 1. FIG. 5A is an FE-SEM image showing the cut hollow structure of Example 3.

Comparative Example 2

In order to evaluate the structural effect resulting from cutting the length of the fibrous structure through ultrasonication and the effect of not using a binder, the cathode comprising the hollow structure obtained in Example 1 was mechanically pulverized, and a cathode in a sheet form was manufactured again using a binder.

Specifically, a predetermined amount of a polyvinylidene fluoride binder was added to an N-methylpyrrolidone solvent and dispersed to give a binder solution. The pulverized hollow structure and the binder solution were mixed such that the weight ratio of the pulverized hollow structure and the binder was 2.5:1, and stirring was sufficiently performed.

The stirred product was uniformly applied to a predetermined thickness on a fixed carbon paper substrate using a vacuum-spraying device. Electrode loading was adjusted at about 1.5 mg of carbon per $cm^2$.

The electrode thus manufactured was dried at 100° C. for 12 hr in a vacuum, thereby completely removing the solvent. The completely dried electrode was blanked to a certain size, and a lithium air battery was manufactured in the same manner as in Example 1.

Figure 5B:
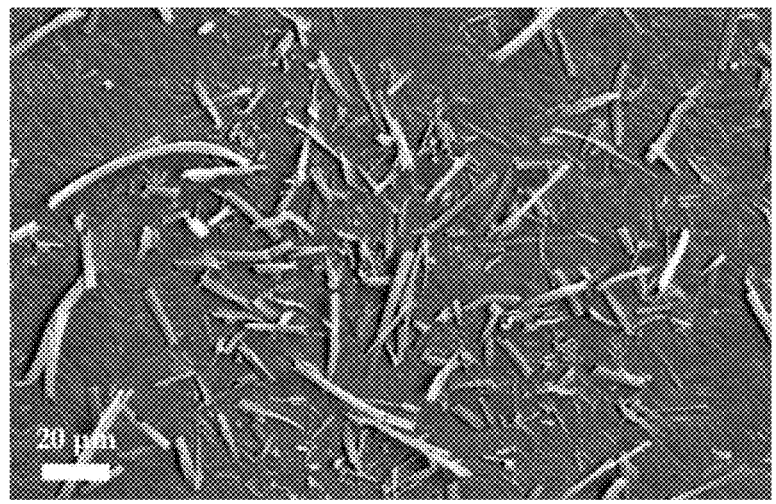
FIG. 5B is an FE-SEM image showing a hollow structure pulverized in Comparative Example 2.

FIG. 5B is an FE-SEM image showing the mechanically pulverized hollow structure of Comparative Example 2.

Measurement Example 2

The lithium air battery of each of Examples 2 and 3 and Comparative Example 2 was subjected to initial charge/discharge testing. When a constant current of 50 $mA/g_{carbon}$ was applied to the lithium air battery, a discharge capacity reaching 2 V, which is a capacity cutoff condition, and a charge capacity reaching 4.5 V upon recharging were measured.

Figure 6:
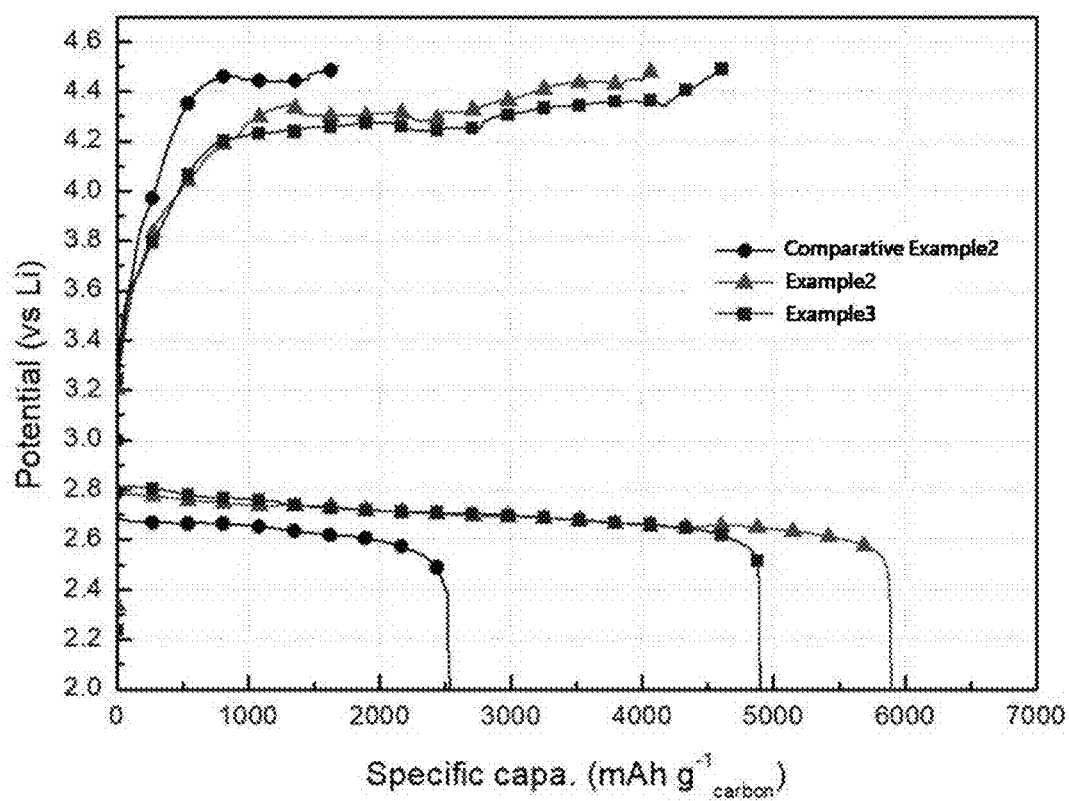
FIG. 6 is a graph showing the results of Measurement Example 2.

FIG. 6 is a graph showing the behavior curve of the constant-current-discharged/charged lithium air battery. With reference to FIG. 6, the discharge capacity was measured to be 2,537 $mAh/g_{carbon}$ in Comparative Example 2, 5,904 $mAh/g_{carbon}$ in Example 2 and 4,900 $mAh/g_{carbon}$ in Example 3. Also, the reversibility was 66.3% in Comparative Example 2 but was improved to 71.0% in Example 2 and 95.4% in Example 3.

According to the present disclosure, the use of the hollow structure, without the binder, increased the capacity and reduced the overvoltage effect. Furthermore, the hollow structure was cut to have a much shorter length, whereby the specific surface area of the electrode was reduced due to a decrease in the space between fibers, and thus the total capacity was decreased by about 17%, but it became easy to access the hollow structure, ultimately increasing the efficiency of internal space utilization thereof, thereby overcoming the existing limited reversibility problem.

Measurement Example 3

The lithium air battery of each of Examples 2 and 3 and Comparative Example 2 was measured for charge/discharge characteristics at different rates. When different constant currents of 50, 100, and 300 $mA/g_{carbon}$ were applied to the lithium air battery, a discharge capacity reaching 2 V, which is a capacity cutoff condition, and a charge capacity reaching 4.5 V upon recharging were measured.

Figure 7A:
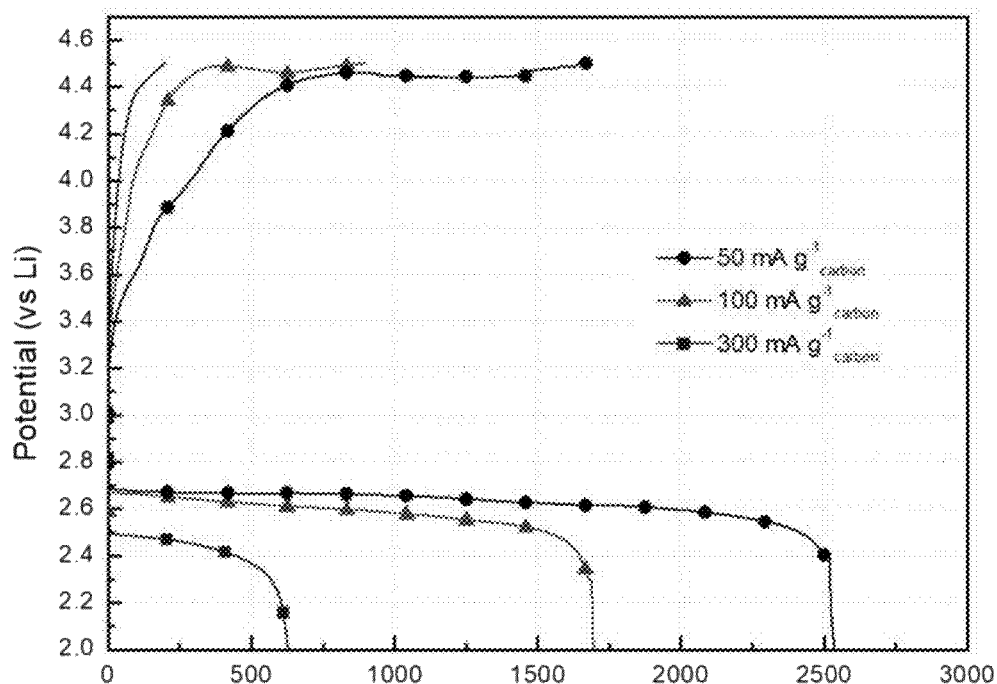
FIG. 7A is a graph showing the results of Measurement Example 3 for the lithium air battery of Comparative Example 2.

With reference to FIG. 7A, as the applied current density was increased to 100 and 300 $mA/g_{carbon}$, in Comparative Example 2, the discharge capacity was decreased by 33.3% and 75.5% and the reversibility was also low, to levels of 52.5% and 31.5%.

Figure 7B:
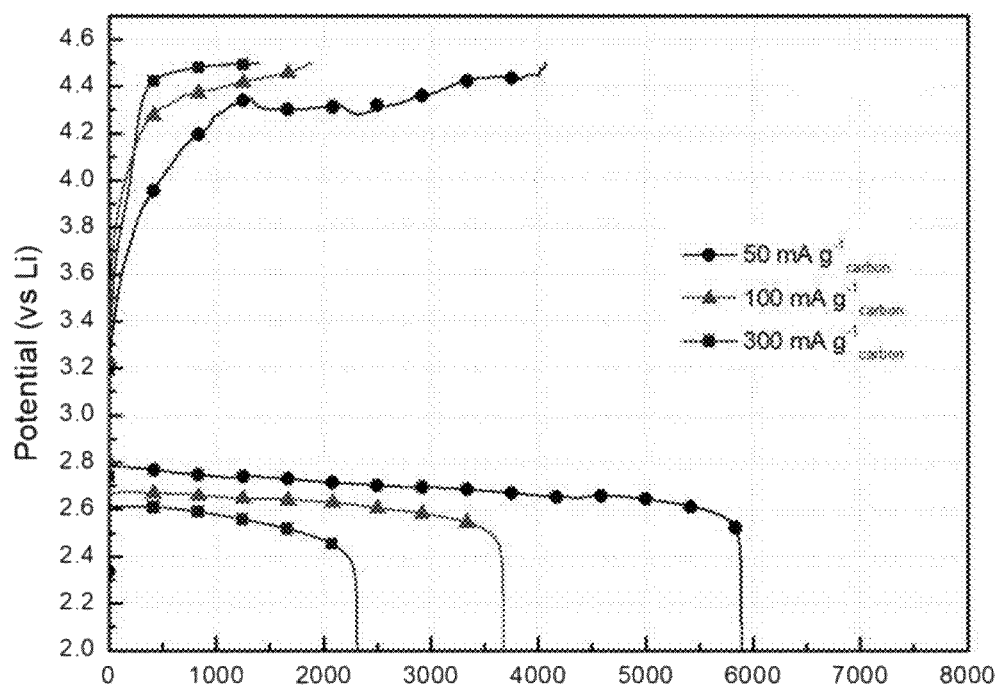
FIG. 7B is a graph showing the results of Measurement Example 3 for the lithium air battery of Example 2.

In contrast, with reference to FIG. 7B, in Example 2, the discharge capacity was decreased by about 37.6% at 100 $mA/g_{carbon}$ and by 60.9% at 300 $mA/g_{carbon}$, and the reversibility was also low, to levels of 50.9% and 56.6% at respective current densities.

Figure 7C:
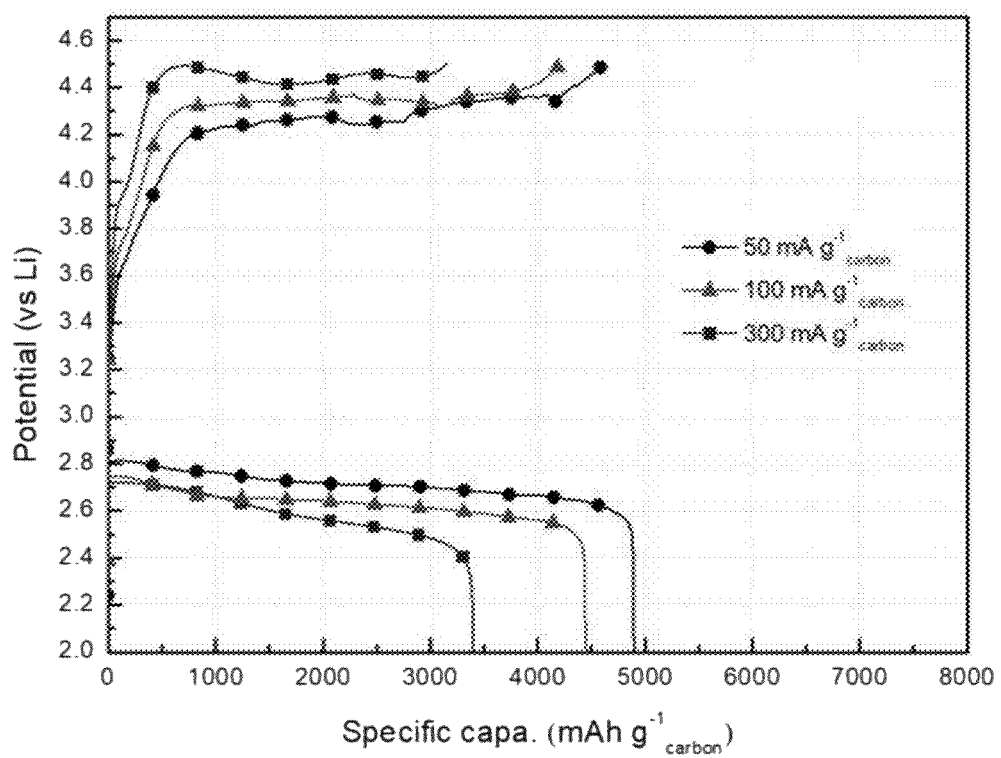
FIG. 7C is a graph showing the results of Measurement Example 3 for the lithium air battery of Example 3.

With reference to FIG. 7C, in Example 3, the extent of decrease in discharge capacity with an increase in current density was significantly reduced, and thus the discharge capacity was decreased by only about 9.2% at a current density of 100 $mA/g_{carbon}$ and by about 30% at a high current density of 300 $mA/g_{carbon}$. The reversibility was greatly improved to 94.7% and 92.2% at respective current densities.

When the length of the hollow structure is cut as described in Example 3, it is easier to transfer the reactants into and out of the hollow structure, whereby the lithium air battery can be found to operate uniformly using the electrode structure even under fast discharging/charging conditions.

Measurement Example 4

Figure 8A:
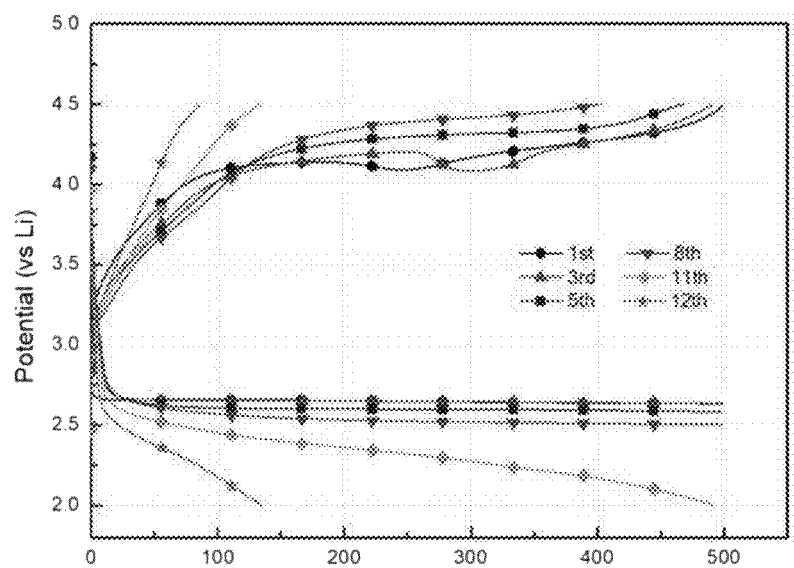
FIG. 8A is a graph showing the results of Measurement Example 4 for the lithium air battery of Comparative Example 2.
Figure 8B:
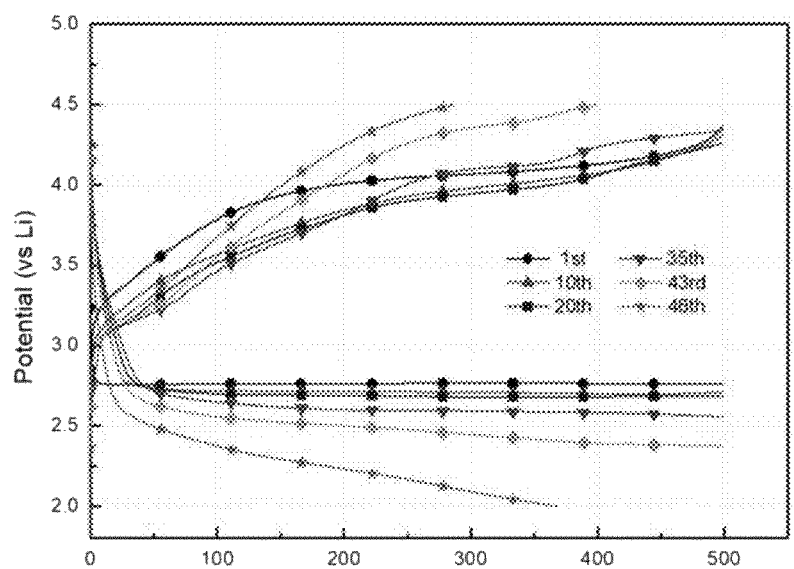
FIG. 8B is a graph showing the results of Measurement Example 4 for the lithium air battery of Example 2.
Figure 8C:
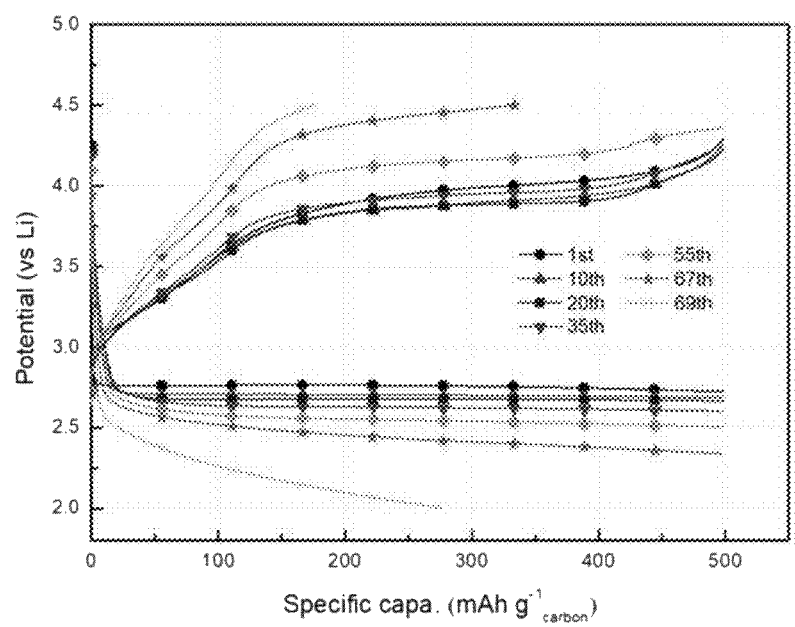
FIG. 8C is a graph showing the results of Measurement Example 4 for the lithium air battery of Example 3.

The lifespan of the lithium air battery of each of Examples 2 and 3 and Comparative Example 2 was measured. Under the condition that the capacity of the lithium air battery was limited to 500 $mAh/g_{carbon}$ and a constant current of 100 $mA/g_{carbon}$ was applied, discharging and charging were repeated and the lifespan of the battery was measured. With reference to FIG. 8A, in Comparative Example 2, the lifespan was maintained up to 11 cycles. As shown in FIG. 8B, in Example 2, the lifespan was maintained up to 45 cycles, and as shown in FIG. 8C, in Example 3, the battery operated stably up to 68 cycles.

According to the present disclosure, as is apparent from Measurement Example 2, when the cut hollow structure was used, compared to when using the uncut hollow structure, the discharge capacity was decreased but the transfer of the reactants through the hollow structure became easier and the efficiency of internal space utilization thereof was increased, thus facilitating the generation and decomposition of lithium peroxide, resulting in a lithium air battery having a prolonged lifespan.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A cathode for a lithium air battery, comprising:
   a sheet comprising a plurality of hollow structures, wherein one or more of the hollow structures has a length of about 0.5 µm to about 300 µm, and the plurality of the hollow structures are randomly entangled to form the sheet,
   wherein the hollow structures include a carbon material having a nitrogen functional group, and
   wherein the nitrogen functional group includes graphitic nitrogen (graphitic-N).

2. The cathode of claim 1, wherein the cathode includes no binder.

3. The cathode of claim 1, wherein each of the hollow structures has a length of about 1 μm to about 100 μm.

4. The cathode of claim 1, wherein each of the hollow structures has a diameter of about 2 μm to about 10 μm.

\* \* \* \* \*